US012155988B2

(12) United States Patent
Hanson et al.

(10) Patent No.: US 12,155,988 B2
(45) Date of Patent: Nov. 26, 2024

(54) OPEN-EAR HEADPHONE

(71) Applicant: Bose Corporation, Framingham, MA (US)

(72) Inventors: Caitlin Hanson, Westborough, MA (US); Robert Knox, Northborough, MA (US); Richard Lionel Lanoue, III, Auburn, MA (US); Allen Graff, Sutton, MA (US); Andrew J. LaFosse, Gardner, MA (US); Nathan T. Smith, Worcester, MA (US); Edgardo Alicea, Brockton, MA (US); Thomas D. Chambers, Bellingham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/142,268

(22) Filed: May 2, 2023

(65) Prior Publication Data

US 2023/0269519 A1 Aug. 24, 2023

Related U.S. Application Data

(63) Continuation of application No. 17/590,509, filed on Feb. 1, 2022, now Pat. No. 11,683,631.

(51) Int. Cl.
*H04R 1/10* (2006.01)

(52) U.S. Cl.
CPC ........... *H04R 1/105* (2013.01); *H04R 1/1016* (2013.01); *H04R 1/1025* (2013.01)

(58) Field of Classification Search
CPC .... H04R 1/105; H04R 1/1016; H04R 1/1025; H04R 2201/10; H04R 2460/09
See application file for complete search history.

(56) References Cited

U.S. PATENT DOCUMENTS

| | | | | |
|---|---|---|---|---|
| 6,456,720 | B1 * | 9/2002 | Brimhall | H04R 25/658 381/322 |
| 9,118,990 | B2 * | 8/2015 | Hankey | H01R 29/00 |
| 9,591,393 | B2 * | 3/2017 | Feeley | H04R 25/60 |
| 2014/0323183 | A1 * | 10/2014 | Klein | H04M 1/6066 455/569.1 |

* cited by examiner

*Primary Examiner* — Brian Ensey
(74) *Attorney, Agent, or Firm* — Hoffman Warnick LLC

(57) ABSTRACT

A flexible arm that is configured to be located between and physically and electrically connect an acoustic module of an open-ear headphone to a battery housing of the open-ear headphone. The flexible arm defines an original resting length and position between the acoustic module and the battery housing. The flexible arm includes a flexible printed circuit that extends through the entire original resting length of the flexible arm and comprises a conductor that is configured to carry electrical energy between the acoustic module and the battery housing. A first interface structure is coupled to one of the acoustic module and the battery housing. A flexible material encases at least some of the flexible printed circuit and at least some of the first interface structure.

20 Claims, 9 Drawing Sheets

OPEN-EAR HEADPHONE

CROSS-REFERENCE TO RELATED APPLICATION

This application is a continuation of and claims priority to application Ser. No. 17/590,509, filed on Feb. 1, 2022, the entire contents of which are incorporated herein by reference for all purposes.

BACKGROUND

This disclosure relates to a headphone that is carried on the ear.

Open-ear headphones typically emit sound close to but not in the ear canal.

SUMMARY

Aspects and examples are directed to an open-ear headphone with an acoustic module that is configured to be located in the concha of the outer ear of the user. In some examples the acoustic module includes a sound-delivery portion that is configured to be located in the cavum conchae. The acoustic module includes a housing that contains an acoustic transducer. There is a sound-emitting opening in the housing that is configured to emit sound produced by the acoustic transducer. The sound-emitting opening is configured to be located close to the ear canal opening when the acoustic module is in place in the concha. The headphone also includes a battery housing that is configured to be located behind the ear, and a flexible arm that is located between and physically and electrically connects the acoustic module and the battery housing. The flexible arm defines an original resting length and position between the acoustic module and the battery housing. The flexible arm includes a flexible printed circuit that extends through the entire original resting length of the flexible arm and comprises a conductor that is configured to carry electrical energy between the acoustic module and the battery housing. There are interface structures at one or both ends of the arm. The interface structures couple the arm to one or both of the battery housing and the acoustic module. A flexible material encases at least some of the flexible printed circuit and at least some of one or both interface structures. In some examples the length of the flexible printed circuit within the flexible arm is greater than the original resting length of the flexible arm. Any extra length of the flexible printed circuit in the arm allows the flexible printed circuit to better accommodate tension or compression on the flexible arm as the flexible arm is bent from its original resting position.

All examples and features mentioned below can be combined in any technically possible way.

In one aspect, a flexible arm that is configured to be located between and physically and electrically connect an acoustic module of an open-ear headphone to a battery housing of the open-ear headphone, wherein the flexible arm defines an original resting length and position between the acoustic module and the battery housing, includes a flexible printed circuit that extends through the entire original resting length of the flexible arm and comprises a conductor that is configured to carry electrical energy between the acoustic module and the battery housing. There is also a first interface structure coupled to one of the acoustic module and the battery housing, A flexible material encases at least some of the flexible printed circuit and at least some of the first interface structure.

Some examples include one of the above and/or below features, or any combination thereof. In an example the flexible material is overmolded on at least some of the flexible printed circuit and at least some of the first interface structure. In an example the flexible material comprises an external layer of the entire flexible arm. In some examples the flexible arm also includes an internal support that interfaces with the flexible printed circuit in the flexible arm. In an example the internal support maintains at least a portion of the flexible printed circuit within the flexible arm in a curved position such that a length of the flexible printed circuit within the flexible arm is greater than the original resting length of the flexible arm, so that the flexible printed circuit can better accommodate tension or compression on the flexible arm as the flexible arm is bent from its original resting position.

Some examples include one of the above and/or below features, or any combination thereof. In some examples the first interface structure comprises a relatively stiff structure that defines at least one opening. In an example the flexible material is located in an opening of the relatively stiff structure. In an example the flexible printed circuit passes through an opening of the relatively stiff structure. In an example the relatively stiff structure defines two openings, and flexible material is located in both openings. In an example the relatively stiff structure further comprises an enlarged end that is mechanically coupled to one of the acoustic module and the battery housing. In an example the relatively stiff structure defines a guide for the flexible printed circuit. In an example the relatively stiff structure further comprises an enlarged end that is mechanically coupled to one of the acoustic module and the battery housing.

Some examples include one of the above and/or below features, or any combination thereof. In some examples the flexible arm further includes a second interface structure coupled to the other of the acoustic module and the battery housing. In an example the first interface structure is coupled to the battery housing and the second interface structure is coupled to the acoustic module. In an example the first interface structure defines a single opening that is filled with the flexible material and further defines a guide for the flexible printed circuit, and the first interface structure is adhered to the battery housing. In an example the second interface structure defines at least one opening, the flexible printed circuit passes through an opening, and the flexible material is located in the at least one opening. In an example the acoustic module comprises two separate pieces that are snapped together around the second interface structure. In an example the original resting position of the flexible arm lies along a curved axis that defines a simple open curve.

In another aspect a flexible arm that is configured to be located between and physically and electrically connect an acoustic module of an open-ear headphone to a battery housing of the open-ear headphone, wherein the flexible arm defines an original resting length and position between the acoustic module and the battery housing, includes a flexible printed circuit that extends through the entire original resting length of the flexible arm and comprises a conductor that is configured to carry electrical energy between the acoustic module and the battery housing, a first interface structure coupled to the battery housing, a second interface structure coupled to the acoustic module, and a flexible material that encases at least some of the flexible printed circuit and at least some of the first and second interface structures. The flexible material comprises an external layer of the entire flexible arm. The first interface structure defines a single opening that is filled with the flexible material and further defines a guide for the flexible printed circuit. The first interface structure is adhered to the battery housing. The second interface structure defines at least one opening. The flexible printed circuit passes through an opening and the flexible material is located in the at least one opening.

Some examples include one of the above and/or below features, or any combination thereof. In an example the flexible arm further includes an internal support that interfaces with the flexible printed circuit in the flexible arm, wherein the internal support maintains at least a portion of the flexible printed circuit within the flexible arm in a curved position such that a length of the flexible printed circuit within the flexible arm is greater than the original resting length of the flexible arm, so that the flexible printed circuit can better accommodate tension or compression on the flexible arm as the flexible arm is bent from its original resting position.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1A:
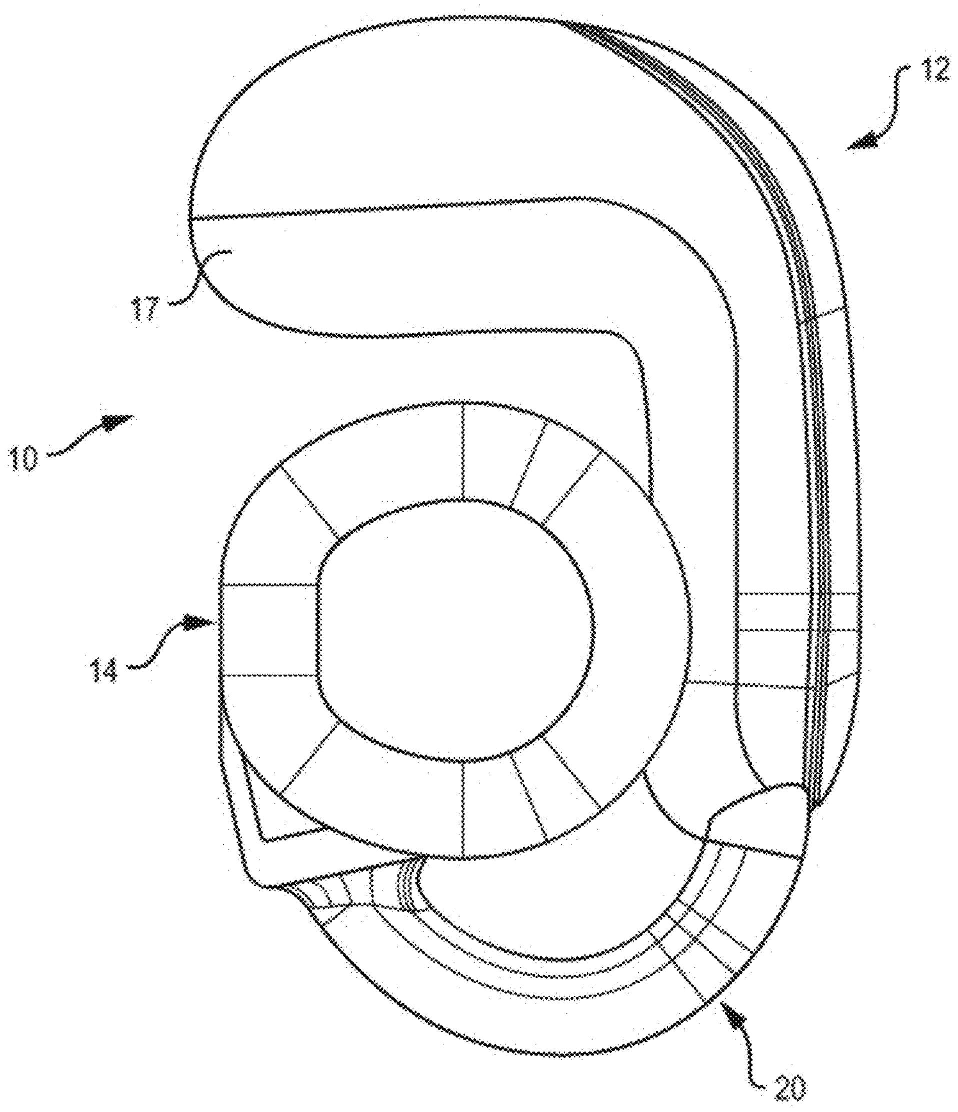
FIG. 1A is a side view of an open-ear headphone.

Open-ear headphones that are carried on the ear should provide high-quality sound, be stable on the ear, be comfortable to wear for long periods of time, be unobtrusive, and look stylish. These goals can be difficult to achieve, as in some respects they have been considered mutually exclusive. For example, stability typically translates into clamping on the outer ear, which can be uncomfortable for long-term wear and also may not look stylish. Also, for high-quality sound there must be sound delivery close to but not in the ear canal, meaning that headphone structure needs to overlie the ear and so may be highly visible to others. Also, for the best sound quality the sound should be delivered close to but not in the ear canal opening.

Examples of the open-ear headphones discussed herein are not limited in application to the details of construction and the arrangement of components set forth in the following description or illustrated in the accompanying drawings. The headphones are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the headphones herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

In some examples herein the open-ear headphone includes a flexible arm that is configured to be located between and physically and electrically connect the acoustic module and the battery housing of the headphone. The flexible arm defines an original resting length and position between the acoustic module and the battery housing. The flexible arm includes a flexible printed circuit that extends through the entire original resting length of the flexible arm. The flexible printed circuit includes one or more conductors that carry electrical energy between the acoustic module and the battery housing. An interface structure is coupled to the acoustic module or the battery housing. A flexible material encases at least some of the flexible printed circuit and at least some of the interface structure. In some examples, the length of the flexible printed circuit within the flexible arm is greater than the original resting length of the flexible arm. The flexible printed circuit can thus better accommodate tension or compression on the flexible arm as the flexible arm is bent from its original resting position.

In some examples the original resting position of the flexible arm lies along a curved axis. In an example the curved axis defines a simple open curve. In an example the curved axis is generally "C"-shaped. In an example the curved axis bisects the flexible arm, and different parts of a first surface of the flexible printed circuit lie on different sides of the curved axis. In an example the flexible printed circuit defines at least one simple open curve along its length within the flexible arm. In an example the flexible printed circuit defines a plurality of both simple open upward curves and simple open downward curves along its length within the flexible arm. In an example each simple open downward curve is adjacent to one more of the simple open upward curves.

Figure 1B:
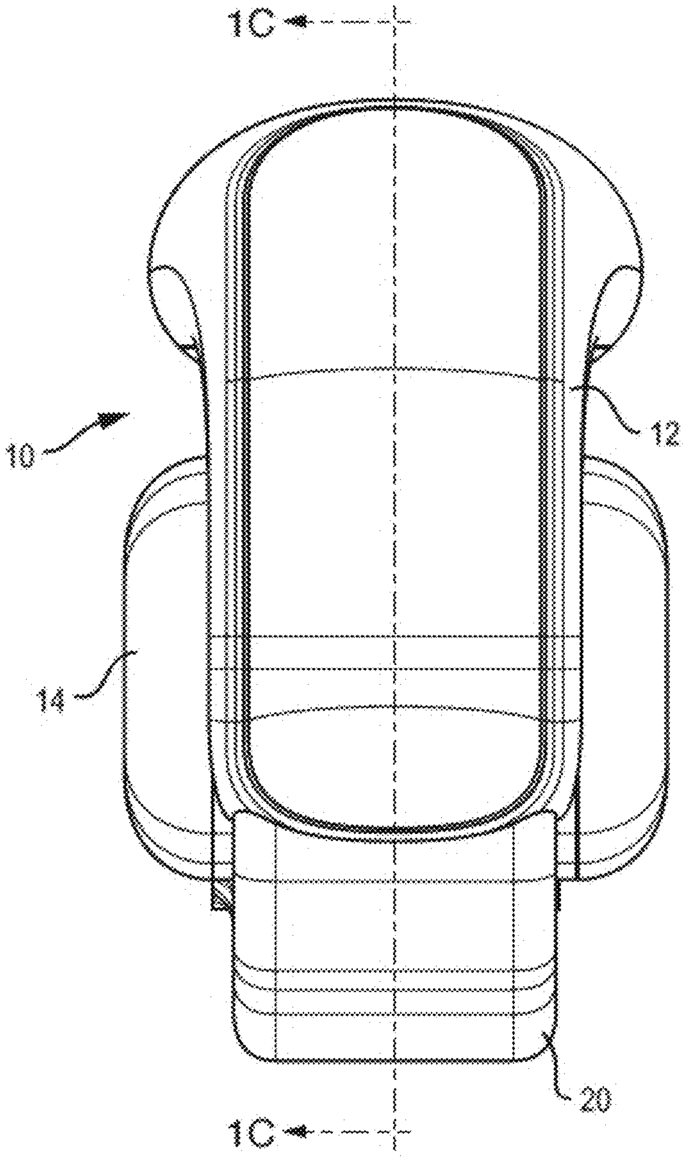
FIG. 1B is a rear view thereof.
Figure 1C:
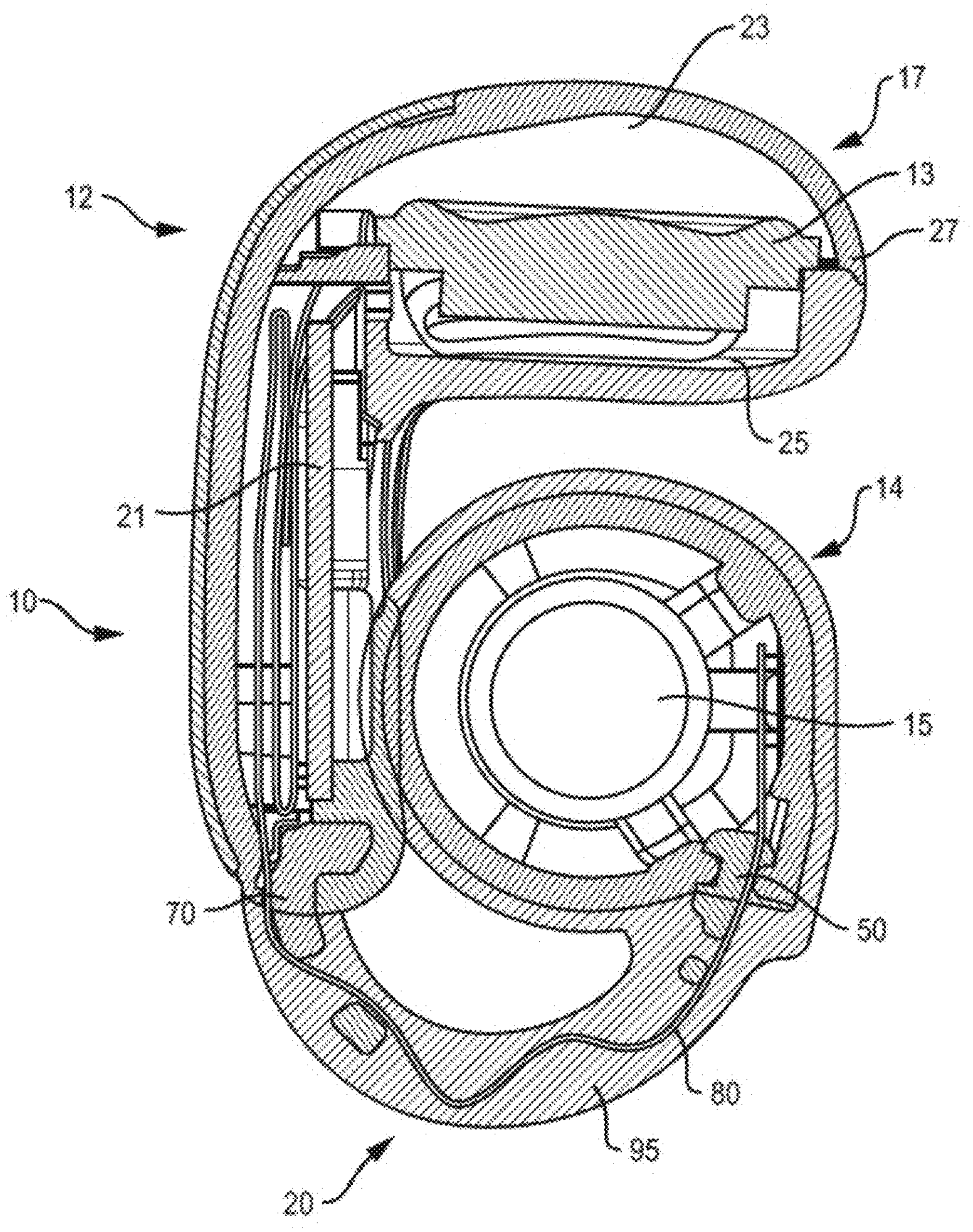
FIG. 1C is a cross-sectional view taken along line 1C-1C, FIG. 1B.

FIG. 1A is a side view of open-ear headphone 10, FIG. 1B is a rear view, and FIG. 1C is a cross-sectional view taken along line 1C-1C, FIG. 1B. Headphone 10 is configured to be carried on an ear of a user such that the distal sound-delivery end 17 of its acoustic module 12 is located in the concha of the ear and battery housing 14 is located behind the ear. Flexible arm 20 is configured to pass over the outer side of the helix, anti-helix and/or lobule of the ear. Arm 20 has an original or resting position and length, illustrated in FIGS. 1A-1C. In some examples the original position generally defines a "C"-shape, as shown in these figures. Arm 20 is configured to be flexed at least along its length, so that the space between acoustic module 12 and battery housing 14 can be slightly increased. This allows headphone 10 to be donned and doffed from the ear without needing to push the headphone over the external ear, yet still provides a light clamping force on the ear to help keep headphone 10 in place on the ear as the user's head moves. Note that FIGS. 1A-1C illustrate some interference between acoustic module 12 and battery housing 14. However, in most examples there is actually a space between the two, as disclosed for example in the patent that is incorporated by reference. In some examples, this interference is modeled so that when arm 20 is molded in this shape it will want to "rest" in this position. This modeling helps to create some preload in the arm.

Electrical signals need to be carried through arm 20. In some examples the electrical signals include or comprise the power from the battery 15 in battery housing 14 to the any powered circuitry and components and the acoustic transducer 13 in acoustic module 12. In some examples, the electrical signals also include audio signals from wireless reception and processing circuitry (not shown) that can be located in one or more of arm 20, battery housing 14, and acoustic module 12. In some examples, these electrical signals are carried by conductors of a flexible printed circuit 80. The flexible printed circuit needs to be able to flex as arm 20 is flexed, yet at the same time needs to carry necessary electrical signals.

Flexible printed circuit 80 carries power from a battery (not shown) held by molded-in ribs 15 to data reception and processing circuitry on printed circuit board 21. Power and audio signals are provided from board 21 to transducer 13. Transducer 13 generates sound pressure in front acoustic cavity 23 and back acoustic cavity 25. Opening(s)/port(s) (not shown) in acoustic module housing 27 are paths for the sound to escape housing 27. Flexible printed circuit 80, arm interface structures 50 and 70, and flexible over-mold material 95 are further described below.

Additional details of an open-ear headphone, including but not limited to its construction, operation, and details of its acoustic performance, are disclosed in U.S. Pat. No. 11,140,469, the entire disclosure of which is incorporated herein by reference and for all purposes. Aspects of the present open-ear headphone that are disclosed in this patent are not further described herein.

In some examples flexible arm 20 includes one or more interface structures. The interface structures are configured to mechanically couple the arm to one or both of the battery housing and the acoustic module. In some examples the interface structures are relatively stiff but have some compliance. The interface structures can be made of an engineered plastic such as a nylon or acrylonitrile butadiene styrene (ABS), or from a rubber or rubber-like material. In some examples the interface structures are made by injection molding or machining or stamping or 3-D printing. In some examples, they are unitary members. The interface structures help to hold the arm in its curved resting position and provide strengthening reinforcements to the arm. In some examples, the interface structures also help to anchor a relatively soft over-mold that covers the entire arm. In some examples the over-mold also covers at least part of the battery housing.

Figure 2A:
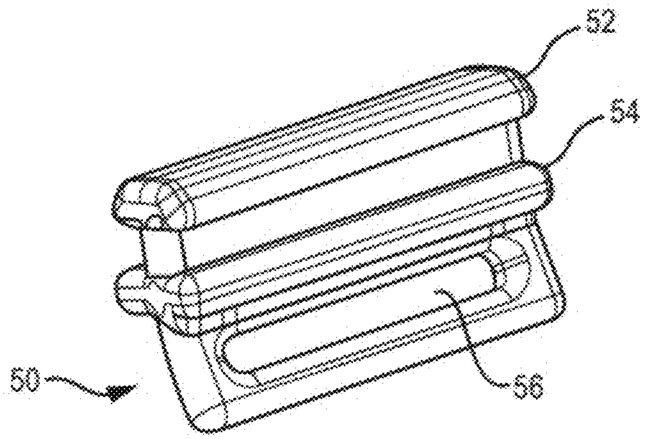
FIG. 2A is a front perspective view of an interface structure for a flexible arm.
Figure 2B:
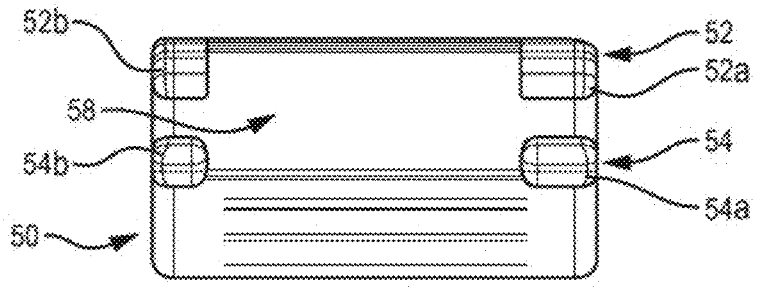
FIG. 2B is a rear view thereof.
Figure 3:
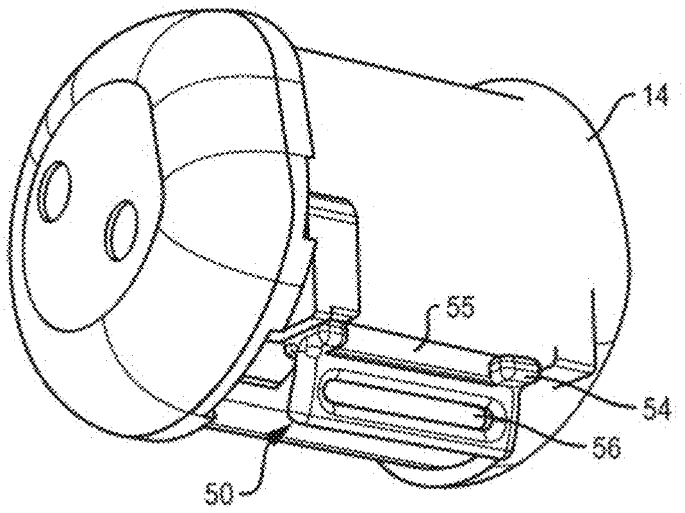
FIG. 3 is a perspective view of the interface structure of FIGS. 2A and 2B engaged with a battery housing of an open-ear headphone.

A first interface structure 50 is illustrated in FIGS. 2A and 2B. Interface structure 50 is a unitary molded plastic part that defines terminal enlarged portion 52, intermediate enlarged portion 54, and opening 56. Interface structure 50 is configured to couple the flexible arm 20 to the battery housing 14, help support and guide the flexible printed circuit, and anchor an over-mold as further explained below. Terminal enlarged portion 52 is configured to be coupled to battery housing 14, as shown in FIG. 3. In some examples, portion 52 is received in a complimentarily-shaped cavity (not shown) in battery housing 14 and/or battery housing 14 is made from two (or more) pieces that are snapped together or otherwise fitted together around portion 52. In some examples, an adhesive (such as a pressure sensitive adhesive) is used to more permanently attach interface structure 50 to battery housing 14.

Interface structure 50 defines a guide 58 for the flexible printed circuit. Guide 58 has a width and thickness that is about the same as that of the flexible printed circuit, so that the flexible printed circuit is guided into the battery housing through slot 55. Guide 58 helps to properly center, align, and support the flexible printed circuit. Guide 58 includes a flat surface created by gaps on the back sides of portion 52 and 54, as shown in FIG. 2B. Portion 52 is defined by separated ends 52*a* and 52*b*. Portion 54 is defined by separated ends 54*a* and 54*b*. Guide 58 is in part defined by the space between ends 52*a* and 52*b* and the space between ends 54*a* and 54*b*.

Opening 56 in interface structure 50 is located outside of and close to battery housing 14. When the arm structure and the battery housing are over-molded with silicone the silicone fills opening 56. This serves to help bond the silicone to interface structure 50 and create a flexible arm 20 that is reinforced and sealed at its end where it meets battery housing 14. In some examples the flexible printed circuit passes through opening 56, which further helps to guide and support the flexible printed circuit.

Figure 4:
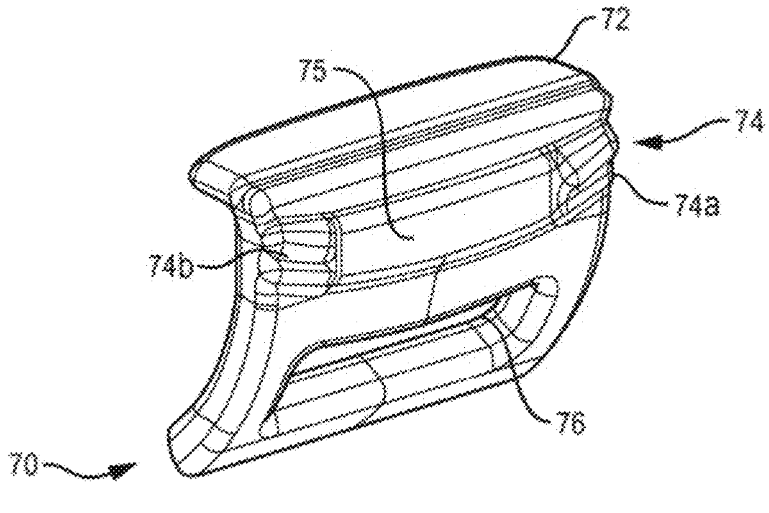
FIG. 4 is a rear perspective view of another interface structure for a flexible arm.
Figure 5:
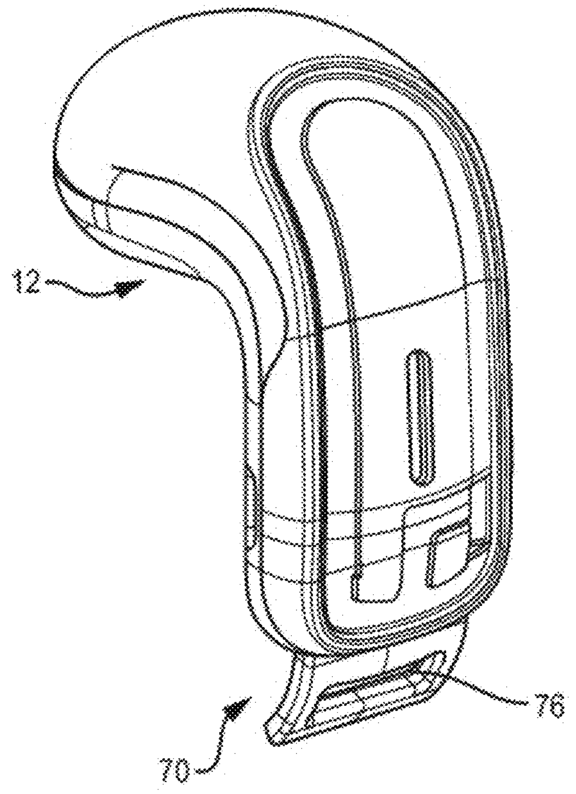
FIG. 5 is a perspective view of the interface structure of FIG. 4 engaged with an acoustic module of an open-ear headphone.

Second interface structure 70, FIG. 4, couples flexible arm 20 to acoustic module 12. Interface structure 70 is a unitary molded plastic part that defines terminal enlarged portion 72, intermediate enlarged portion 74 defined by separated ends 74*a* and 74*b*, and opening 76. Interface structure 70 is configured to couple the flexible arm 20 to the acoustic module 12, help support and guide the flexible printed circuit, and anchor an over-mold. Terminal enlarged portion 72 is configured to be coupled to acoustic module 12, as shown in FIG. 5. In some examples, portion 72 is received in a complimentarily-shaped cavity (not shown) in acoustic module 12 and/or acoustic module 12 is made from two (or more) pieces that are snapped together or otherwise fitted together around portion 72. In some examples, an adhesive (such as a pressure sensitive adhesive) is used to more permanently attach interface structure 70 to acoustic module 12.

Interface structure 70 defines a guide 75 for the flexible printed circuit. Guide 75 has a width and thickness that is about the same as that of the flexible printed circuit, so that the flexible printed circuit is guided into the acoustic module through a slot (not shown). Guide 75 helps to properly center, align, and support the flexible printed circuit. Guide 75 includes a flat surface created by a gap between ends 74*a* and 74*b*, as shown in FIG. 4.

Opening 76 in interface structure 70 is located outside of and close to acoustic module 12. When the arm structure (and in some cases the portion of acoustic module 12 adjacent to interface structure 70) is over-molded with silicone the silicone fills opening 76. This serves to help bond the silicone to interface structure 70 and create a flexible arm 20 that is reinforced and sealed at its end where it meets acoustic module 12. In some examples (such as shown in FIG. 6A) the flexible printed circuit passes through opening 76, which further helps to guide and support the flexible printed circuit.

Figure 6A:
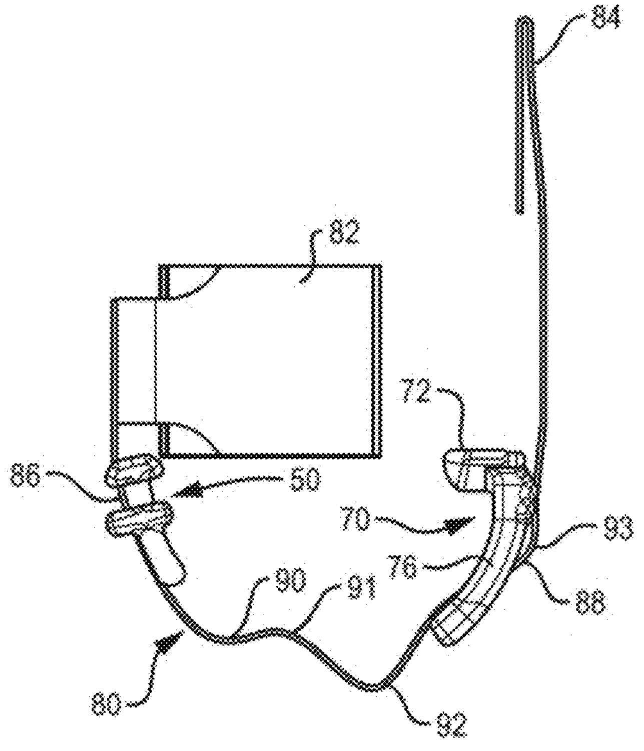
FIG. 6A is a partial view of a flexible printed circuit of a flexible arm engaged with the interface structures of FIGS. 2A, 2B, and 4.

A manner in which flexible printed circuit 80 interfaces with interface structure 50 and interface structure 70 is illustrated in FIG. 6A. Flexible printed circuit first end 82 is configured to interface with a printed circuit board that connects to the two terminals of the battery (not shown) in battery housing 14, while second end 84 is configured to interface with a printed circuit board (such as printed circuit board 21, FIG. 1C) in acoustic module 12. In order to accommodate flexing of arm 20 while reducing stress on flexible printed circuit 80, flexible printed circuit 80 can have a length in arm 20 that is longer than the nominal resting length of arm 20. The additional length can be accomplished with one or more curves in the flexible printed circuit that are held in flexible arm 20. Adjacent simple open upward and downward curves 90, 91, 92 and 93 are shown. In some examples, one or more of the curves are held in place with an internal support in the arm. In some examples, the internal support(s) include one or more of interface structure 50, interface structure 70, and/or internal support 100, FIGS. 7A and 7B. In this example, portion 88 of flexible printed circuit 80 is threaded though opening 76 of interface structure 70.

Figure 6B:
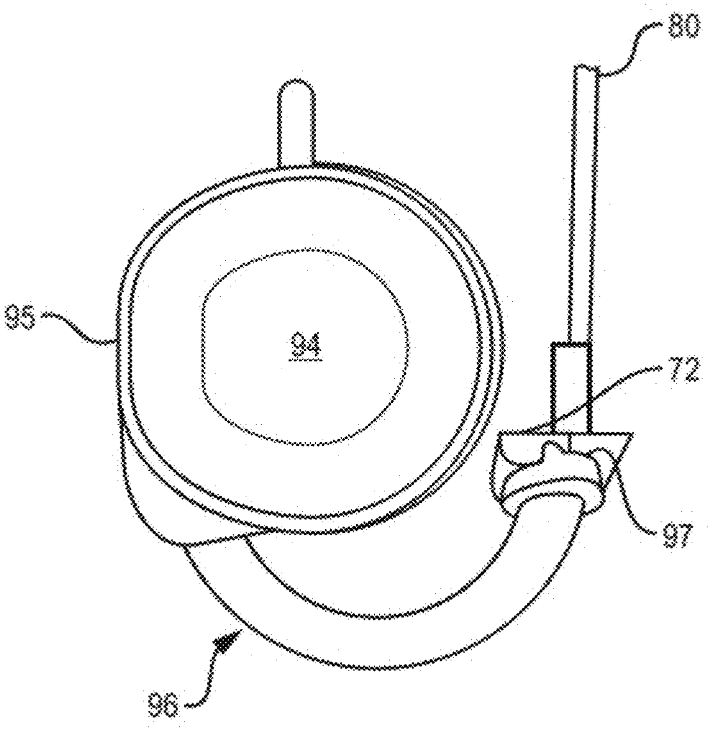
FIG. 6B illustrates a partially assembled open-ear headphone with a flexible arm.

In some examples herein, an over-mold encircles and encases the flexible printed circuit along at least most and preferably all of the original resting length of the flexible arm, as well as some and preferably all of any internal supports and interface structures. For example flexible arm 96, FIG. 6B, includes over-mold 95 that fully covers flexible printed circuit 80 in arm 96. FIG. 6B illustrates a flexible arm such as the one that is partially depicted in FIG. 6A. In an example over-mold 95 is a silicone material. Over-mold 95 comprises the outer layer of arm 96 and also covers some or all of battery housing member 94 and so also defines the outer layer of some or all of battery housing 14. Over-mold 95 can be accomplished using an insert molding technique. Enlarged end 97 represents a part of the over-molding that would overlie or abut the acoustic module, not shown in this view. Also shown in this view is enlarged end 72 of interface structure 70 that functions to help mechanically couple arm 96 to the acoustic module and also provide stress relief for flexible printed circuit 80. Over-mold 95 also helps to increase the environmental stability of the flexible arm by sealing openings between portions 50 and 70 and the battery housing and the acoustic module, while retaining the flexibility of the arm.

Figure 7A:
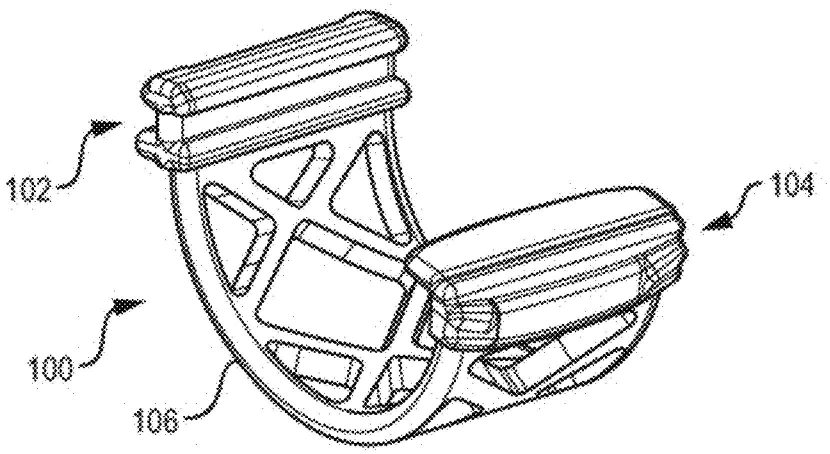
FIG. 7A is a front perspective view of an internal support for a flexible arm.
Figure 7B:
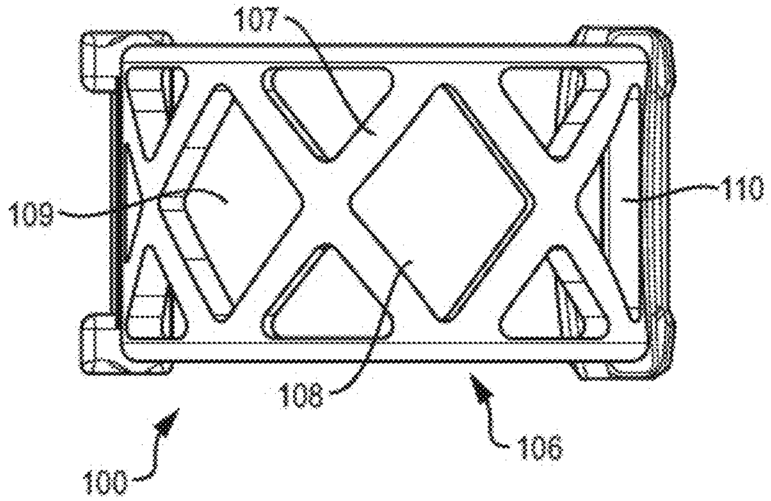
FIG. 7B is a rear view thereof.
Figure 8:
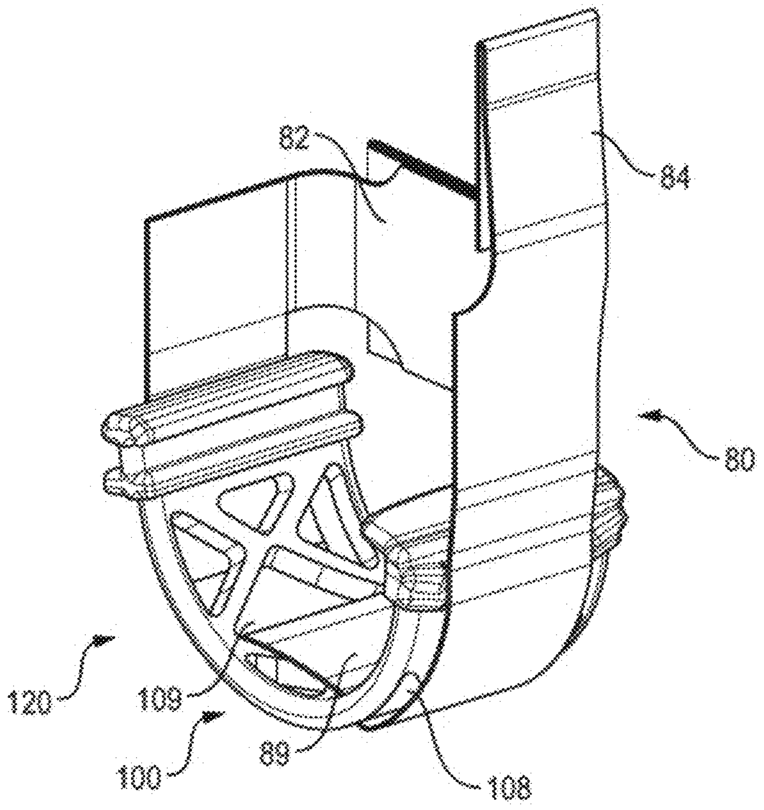
FIG. 8 is a partial view of a flexible printed circuit of a flexible arm engaged with the internal support of FIGS. 7A and 7B.

A different internal support 100 is illustrated in FIGS. 7A, 7B, and 8. Internal support 100 can be made by injection molding or machining or stamping. In some examples it is a unitary member. Internal support 100 includes body 106 with openings that create or define struts, for example strut 107 and openings 108, 109, and 110. Enlarged ends 102 and 104 (which function like interface structure 50 and interface structure 70) are configured to be mechanically coupled to one of the battery housing and the acoustic module such as by an interference fit and/or by an adhesive. Such an internal support helps to provide a level of stiffness to the arm needed to securely maintain the open-ear headphone on the ear without being so tight as to be painful. Different structural designs can provide different levels of bending stiffness and resistance to torsional forces. Examples include but are not limited to lattice designs, perforated designs, and slotted designs. Internal supports can alternatively be made from spring steel or nitinol wire.

The flexible printed circuit can but need not pass through one or more openings of the support. For example, and as shown in FIG. 8, portion 89 of flexible printed circuit 80 is threaded through openings 108 and 109, which helps to provide stress relief to flexible printed circuit 80. In some examples the arm is completed by over-molding with a flexible material which encases all or substantially all of internal support 100. The over-molding will fill or at least partially or substantially fill the openings of internal support 100, thus helping to anchor internal support 100 in the arm. In some examples, internal support 100 also acts as a guide for flexible printed circuit 80, which can pass over the back of internal support 100, as shown in FIG. 8 and similarly to the guiding functions illustrated in FIGS. 2B, 4, and 6A.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A flexible arm that is configured to be located between and physically and electrically connect an acoustic module of an open-ear headphone to a battery housing of the open-ear headphone, wherein the flexible arm defines an original resting length and position between the acoustic module and the battery housing, the flexible arm comprising:

a flexible printed circuit that extends through the entire original resting length of the flexible arm and comprises a conductor that is configured to carry electrical energy between the acoustic module and the battery housing;

a first interface structure that defines an enlarged end that is mechanically coupled to the battery housing and that further defines a guide for the flexible printed circuit; and a second interface structure that defines an enlarged end that is mechanically coupled to the acoustic module and that further defines a guide for the flexible printed circuit.

2. The flexible arm of claim 1 further comprising a flexible material that encases at least some of the flexible printed circuit and at least some of the first and second interface structures.

3. The flexible arm of claim 2 wherein the flexible material is overmolded on at least some of the flexible printed circuit and at least some of the first and second interface structures.

4. The flexible arm of claim 2 wherein the flexible material comprises an external layer of the entire flexible arm.

5. The flexible arm of claim 2 further comprising an internal support that interfaces with the flexible printed circuit in the flexible arm.

6. The flexible arm of claim 5 wherein the internal support maintains at least a portion of the flexible printed circuit within the flexible arm in a curved position such that a length of the flexible printed circuit within the flexible arm is greater than the original resting length of the flexible arm, so that the flexible printed circuit can better accommodate tension or compression on the flexible arm as the flexible arm is bent from its original resting position.

7. The flexible arm of claim 2 wherein the first interface structure further defines at least one opening.

8. The flexible arm of claim 7 wherein the flexible material at least partially fills an opening of the first interface structure.

9. The flexible arm of claim 7 wherein the flexible printed circuit passes through an opening of the first interface structure.

10. The flexible arm of claim 2 wherein the second interface structure further defines at least one opening.

11. The flexible arm of claim 10 wherein the flexible material at least partially fills an opening of the second interface structure.

12. The flexible arm of claim 10 wherein the flexible printed circuit passes through an opening of the second interface structure.

13. The flexible arm of claim 1 wherein the enlarged end of the first interface structure is adhered to the battery housing.

14. The flexible arm of claim 1 wherein the acoustic module comprises two separate pieces that are snapped together around the enlarged end of the second interface structure.

15. The flexible arm of claim 1 wherein the original resting position of the flexible arm lies along a curved axis that defines a simple open curve.

16. The flexible arm of claim 1 wherein the flexible printed circuit has a width, and the first interface structure guide comprises first and second raised portions that are separated by a distance that is about the same as the width of the flexible printed circuit, so that the flexible printed circuit can be located between the first and second raised portions.

17. The flexible arm of claim 1 wherein the flexible printed circuit has a width, and the second interface structure guide comprises first and second raised portions that are separated by a distance that is about the same as the width of the flexible printed circuit, so that the flexible printed circuit can be located between the first and second raised portions.

18. A flexible arm that is configured to be located between and physically and electrically connect an acoustic module of an open-ear headphone to a battery housing of the open-ear headphone, wherein the flexible arm defines an original resting length and position between the acoustic module and the battery housing, the flexible arm comprising:

a flexible printed circuit that extends through the entire original resting length of the flexible arm and comprises a conductor that is configured to carry electrical energy between the acoustic module and the battery housing;

a first interface structure that defines an enlarged end that is mechanically coupled to the battery housing and that further defines a guide for the flexible printed circuit;

a second interface structure that defines an enlarged end that is mechanically coupled to the acoustic module and that further defines a guide for the flexible printed circuit; and a flexible material that is overmolded on and encases at least some of the flexible printed circuit and at least some of the first and second interface structures, wherein the flexible material comprises an external layer of the entire flexible arm.

19. The flexible arm of claim 18 wherein the flexible material at least partially fills an opening of the first interface structure and an opening of the second interface structure.

20. The flexible arm of claim 19 wherein the flexible printed circuit has a width, the first interface structure guide comprises first and second raised portions that are separated by a distance that is about the same as the width of the flexible printed circuit so that the flexible printed circuit can be located between the first and second raised portions of the first interface structure guide, and the second interface structure guide comprises first and second raised portions that are separated by a distance that is about the same as the width of the flexible printed circuit so that the flexible printed circuit can be located between the first and second raised portions of the second interface structure guide.

* * * * *